(12) United States Patent
Han et al.

(10) Patent No.: US 10,146,347 B2
(45) Date of Patent: Dec. 4, 2018

(54) DISPLAY DEVICE HAVING AN INTEGRATED DISPLAY PANEL AND TOUCH PANEL

(71) Applicant: Samsung Display Co., Ltd., Yongin-si, Gyeonggi-do (KR)

(72) Inventors: Sang-Woo Han, Cheonan-si (KR); Tae Joon Kim, Seongnam-si (KR); Kwan Young Han, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/212,031

(22) Filed: Jul. 15, 2016

(65) Prior Publication Data
US 2016/0328064 A1 Nov. 10, 2016

Related U.S. Application Data

(63) Continuation of application No. 14/189,705, filed on Feb. 25, 2014, now Pat. No. 9,740,318.

(30) Foreign Application Priority Data

Oct. 11, 2013 (KR) .......................... 10-2013-0121476

(51) Int. Cl.
*G06F 3/041* (2006.01)
*G06F 1/16* (2006.01)
*G06F 3/044* (2006.01)

(52) U.S. Cl.
CPC .......... *G06F 3/0412* (2013.01); *G06F 1/1643* (2013.01); *G06F 3/044* (2013.01); *G06F 3/0416* (2013.01); *G06F 1/1626* (2013.01); *G06F 1/1686* (2013.01); *G06F 1/1688* (2013.01); *G06F 2203/04102* (2013.01); *G06F 2203/04103* (2013.01); *G06F 2203/04112* (2013.01)

(58) Field of Classification Search
CPC ...................................................... G06F 3/0412
USPC ................................................................. 345/173
See application file for complete search history.

(56) References Cited

U.S. PATENT DOCUMENTS

| 2010/0039398 A1* | 2/2010 | Lin | G06F 3/041 345/173 |
| 2010/0188360 A1 | 7/2010 | Joung et al. | |
| 2011/0227847 A1* | 9/2011 | Yoshiyama | G06F 3/041 345/173 |
| 2011/0242017 A1* | 10/2011 | Kang | G06F 3/045 345/173 |

(Continued)

FOREIGN PATENT DOCUMENTS

| KR | 10-0894710 B1 | 4/2009 |
| KR | 10-2010-0031301 A | 3/2010 |

(Continued)

*Primary Examiner* — Long D Pham
(74) *Attorney, Agent, or Firm* — Lewis Roca Rothgerber Christie LLP

(57) ABSTRACT

In an aspect, a display device including: an entire window, said entire window including a display area and a non-display area outside the display area; a display panel; a first adhesive layer disposed on the display panel; a touch screen panel disposed on the first adhesive layer; a first light blocking member disposed on the touch screen panel; a second adhesive layer disposed on the touch screen panel and the first light blocking member; and a protection window disposed on the second adhesive layer is provided.

9 Claims, 7 Drawing Sheets

(56) References Cited

U.S. PATENT DOCUMENTS

| | | |
|---|---|---|
| 2011/0242057 A1 | 10/2011 | Lee et al. |
| 2012/0026107 A1 | 2/2012 | Kim et al. |
| 2012/0154725 A1 | 6/2012 | Jeon et al. |
| 2013/0016047 A1 | 1/2013 | Masumoto |
| 2014/0078412 A1 | 3/2014 | Franklin et al. |
| 2014/0078419 A1 | 3/2014 | Lin et al. |
| 2014/0132854 A1 | 5/2014 | Wu et al. |
| 2014/0176826 A1 | 6/2014 | Kim et al. |
| 2015/0034370 A1* | 2/2015 | Yu .......................... G06F 3/041 174/255 |

FOREIGN PATENT DOCUMENTS

| | | |
|---|---|---|
| KR | 10-0974073 B1 | 7/2010 |
| KR | 10-0980551 B1 | 8/2010 |
| KR | 10-1031239 B1 | 4/2011 |
| KR | 10-1125701 B1 | 3/2012 |
| KR | 10-2012-0048854 A | 5/2012 |
| KR | 10-2013-0044628 A | 5/2013 |
| WO | WO 2013/122293 * | 8/2013 |

* cited by examiner

DISPLAY DEVICE HAVING AN INTEGRATED DISPLAY PANEL AND TOUCH PANEL

CROSS-REFERENCE TO RELATED APPLICATIONS

Any and all priority claims identified in the Application Data Sheet, or any correction thereto, are hereby incorporated by reference under 37 CFR 1.57. For example, this application is a continuation of and claims priority to U.S. patent application Ser. No. 14/189,705, filed Feb. 25, 2014, which claims priority to and the benefit of Korean Patent Application No. 10-2013-0121476, filed on Oct. 11, 2013, in the Korean Intellectual Property Office, each of which is incorporated herein by reference in its entirety.

BACKGROUND

Field

This disclosure relates to a display device. For example, the present disclosure relates to a display device realizing a touch function to an entire window.

Description of the Related Technology

In general, a display device includes a display area displaying an image, and a non-display area as a perimeter around the display area in which the image is not displayed. Typically, a touch screen panel configured as an input device receiving a touch position is disposed in the display area. By having the touch screen panel in the display area, input and output may be simultaneously performed. Additionally, a display device or corporate logo may be printed, and a function key such as a power key, may be located in the non-display area.

The touch screen panel may be connected to an integrated circuit (IC) to sense the touch position. Also, the function key located at the non-display area may be connected to a separate flexible printed circuit (FPC) and the IC causing the configuration of the display device to be complicated.

In addition, in the entire window of the display device, a region capable of input is limited to the display area in which the touch screen is disposed and to the region in which the function key is disposed in the non-display area.

The above information disclosed in this Background section is only for enhancement of understanding of the background of the disclosure and therefore it may contain information that does not form the prior art that is already known to a person of ordinary skill in the art.

SUMMARY

Embodiments of the present disclosure provide a display device achieving a touch function on an entire window of the display device.

Some embodiments provide a display device including: an entire window, said entire window including a display area and a non-display area outside the display area; a display panel including a plurality of display elements and displaying an image by using the plurality of display elements; a first adhesive layer disposed on the display panel; a touch screen panel disposed on the first adhesive layer; a first light blocking member disposed on the touch screen panel; a second adhesive layer disposed on the touch screen panel and the first light blocking member; and a protection window disposed on the second adhesive layer, wherein the touch screen panel is formed at the entire window including.

In some embodiments, the first light blocking member may be disposed at the non-display area.

In some embodiments, the first light blocking member may be formed of a black pattern.

In some embodiments, the first light blocking member may be formed of a color pattern for a design of the non-display area.

In some embodiments, the non-display area may include a first portion in which a speaker and a camera lens are disposed, and a second portion in which a microphone and a function key are disposed.

In some embodiments, a second light blocking member disposed at the non-display area under the touch screen panel may be further included.

In some embodiments, a first coating layer disposed on the touch screen panel and the first light blocking member may be further included.

In some embodiments, the color pattern for the design may be formed at a portion corresponding to the non-display area in the first coating layer.

In some embodiments, a second coating layer disposed on the first coating layer may be further included.

In some embodiments, the second coating layer may be deposited and coated on the color pattern formed at the first coating layer to improve reflectance of the color pattern.

In some embodiments, a second light blocking member disposed at the non-display area under the touch screen panel may be further included.

In some embodiments, the plurality of elements may be selected from the group consisting an organic light emitting display, a liquid crystal display, a field emission display, and a plasma display.

In some embodiments, the touch screen panel may include: a transparent substrate; a plurality of driving electrodes disposed on the transparent substrate; an insulating layer disposed on the plurality of driving electrodes; and a sensing electrode disposed on the insulating layer.

Some embodiments provide a display device including: an entire window, said entire window including a display area and a non-display area outside the display area; a display panel including a plurality of display elements and displaying an image by using the plurality of display elements; and a touch screen panel disposed on the display panel and formed at the entire window where a function key is disposed in the non-display area, wherein the function key is operated by the touch screen panel.

In some embodiments, a first light blocking member disposed at the non-display area may be further included in the display device.

In some embodiments, the first light blocking member may be formed of one of a black pattern and a color pattern for a design.

In some embodiments, the first light blocking member may be disposed on the touch screen panel, and a second light blocking member disposed at the non-display area under the touch screen panel may be further included.

In some embodiments, a first coating layer disposed on the touch screen panel and the first light blocking member may be further included.

In some embodiments of the first coating layer, a color pattern for the design may be formed at a portion corresponding to the non-display area.

In some embodiments, a second coating layer deposited and coated on the color pattern formed on the first coating layer may be further included in the display device.

In some embodiments, the touch function may be realized at the entire window of the display device.

In some embodiments, an FPC and an IC for the function key of the non-display area are not separately required such that a configuration of the display device may be simplified.

In some embodiments, a decorative film on which the pattern for the design of the display device or a corporate logo is printed or an adhesive layer to adhere the decorative film is omitted such that the thickness of the display device may be reduced.

DETAILED DESCRIPTION

Figure 1:
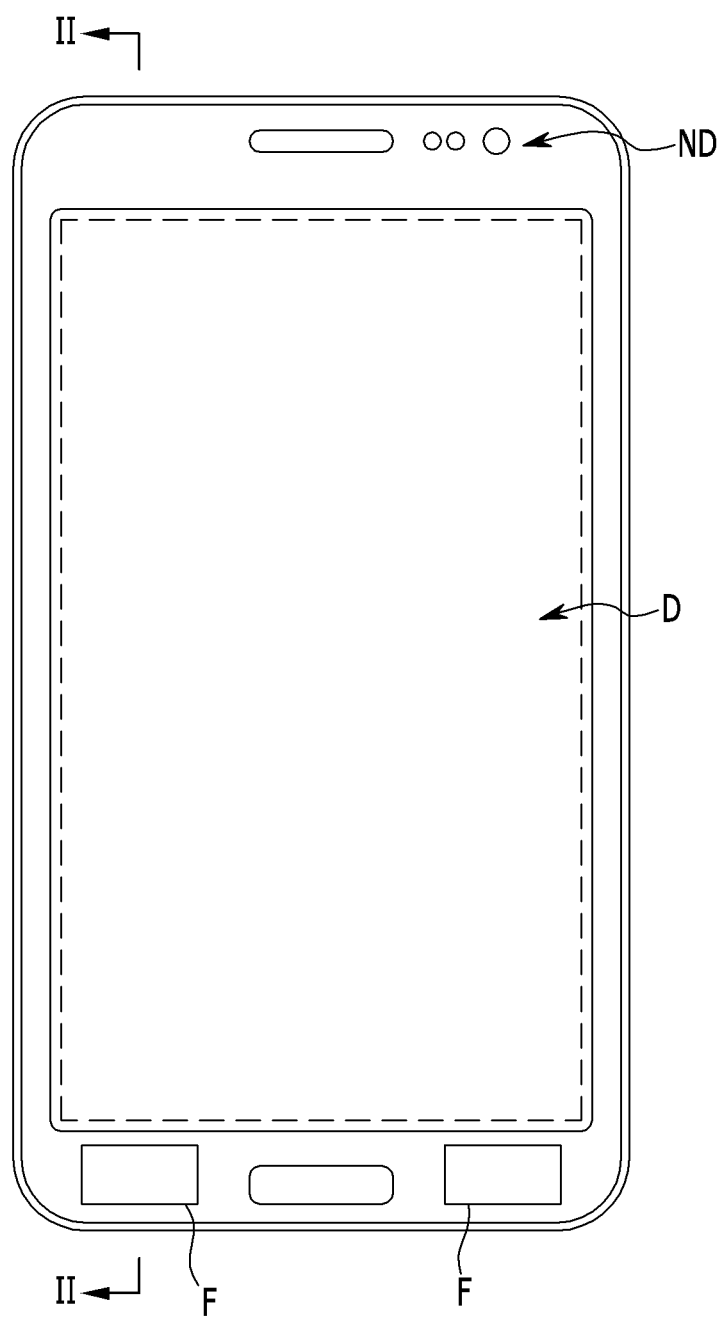
FIG. 1 is a schematic view of an exterior of a display device according to an exemplary embodiment.

The present disclosure will be described more fully hereinafter with reference to the accompanying drawings, in which exemplary embodiments are shown. As those skilled in the art would realize, the described embodiments may be modified in various different ways, all without departing from the spirit or scope of the present embodiments.

Also, in describing various exemplary embodiments, elements which have the same composition between the exemplary embodiments are referred to by using the same numerals and are described representatively in a first exemplary embodiment. In the remaining exemplary embodiments other than the first exemplary embodiment, only elements that are different from those in the first exemplary embodiment are described.

For clarity, parts not related to the illustration will be omitted, and the same reference numbers will be denoted for the same or similar elements throughout the specification.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. In contrast, when an element is referred to as being "directly on" another element, there are no intervening elements present. Likewise, it will be understood that when an element such as a layer, film, region, or substrate is referred to as being "beneath" another element, it can be directly beneath the other element or intervening elements may also be present.

FIG. 1 is a schematic view of an exterior of a display device according to an exemplary embodiment.

Referring to FIG. 1, an exterior of a display device that is shown is one exemplary embodiment, and the exterior of the display device may be variously changed. In the exemplary embodiment shown in FIG. 1 the display device is a mobile phone. However, the display device is not limited to the mobile phone and may be various devices such as a PMP (Portable Multimedia Player), a PDA (Personal Digital Assistant), a laptop, a TV, or a DID (Digital Information Display).

As shown in FIG. 1, an entire window of the display device may include a display area D displaying an image and a non-display area ND in which the image is not displayed. The display area D is a region where the image is displayed by the display panel. In the non-display area ND as a portion in which the display panel is disposed outside the display area D, a microphone, a speaker, a camera lens, various function keys F, etc., may be disposed. That is, the non-display area ND includes a first portion in which the speaker and the camera lens are disposed and a second portion in which the microphone and the function key F are disposed.

Now, the configuration of the display device will be described with reference to FIG. 2. For convenience of explanation, in the display device, an external case portion is omitted and only the panel is described.

Figure 2:
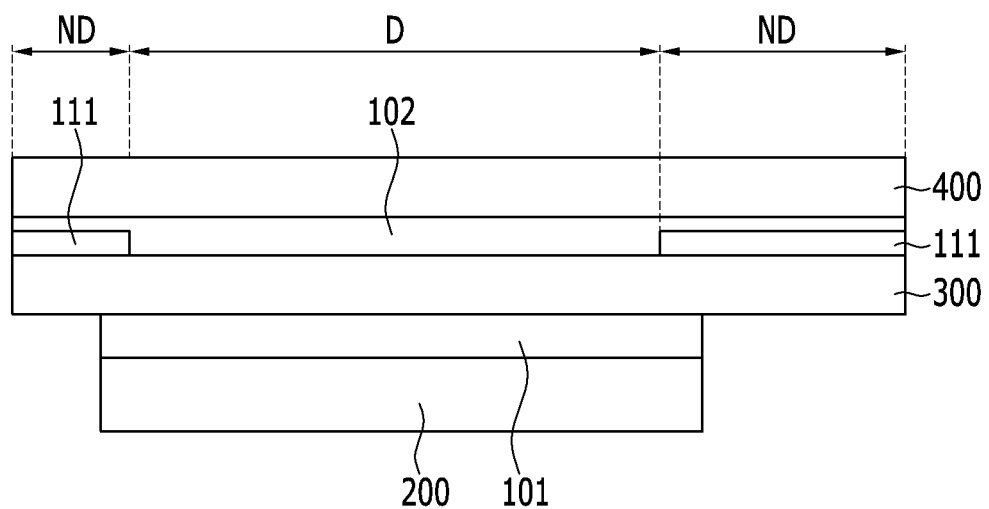
FIG. 2 is a cross-sectional view of a display device according to an exemplary embodiment, taken along a line II-II of FIG. 1.

FIG. 2 is a cross-sectional view of a display device according to an exemplary embodiment of the present invention, taken along a line II-II of FIG. 1.

Referring to FIG. 2, the display device includes a display panel 200, a first adhesive layer 101 disposed on the display panel 200, a touch screen panel 300 disposed on the first adhesive layer 101, a first light blocking member 111 disposed at the non-display area ND on the touch screen panel 300, a second adhesive layer 102 disposed on the touch screen panel 300 and the first light blocking member 111, and a protection window 400 disposed on the second adhesive layer 102.

In some embodiments, the display panel 200 includes a plurality of display elements. In some embodiments, the plurality of display elements may be one among the display elements including an organic light emitting display (OLED), a liquid crystal display (LCD), a field emission display (FED), and a plasma display panel (PDP). In some embodiments, the display panel 200 may be one display panel among the organic light emitting display, the liquid crystal display, the field emission display, and the plasma display panel. In some embodiments, the display panel 200 as a device displaying the image by using a plurality of display elements may be manufactured according to a width of the display area D. That is, the display panel 200 corresponds to the display area D.

In some embodiments, the first adhesive layer 101 is provided to adhere the display panel 200 and the touch screen panel 300 together. In some embodiments, an optical clear adhesive (OCA) may be used as the first adhesive layer 101.

In some embodiments, the touch screen panel 300 may be manufactured according to the entire window including the display area D and the non-display area ND. In some embodiments, the touch screen panel 300 is formed at the display area D and the non-display area ND. In some embodiments, the touch screen panel 300 may be wider than the display panel 200.

In some embodiments, the touch screen panel 300 may be formed into various types such as a resistive-type touch screen panel, a capacitance-type touch screen panel, an ultrasonic wave-type touch screen panel, an optical sensor-type touch screen panel, and an electro-magnetic induction-type touch screen panel.

Here, the touch screen panel 300 may be the capacitance-type touch screen panel, and it will be described with reference to FIG. 3 and FIG. 4.

Figure 3:
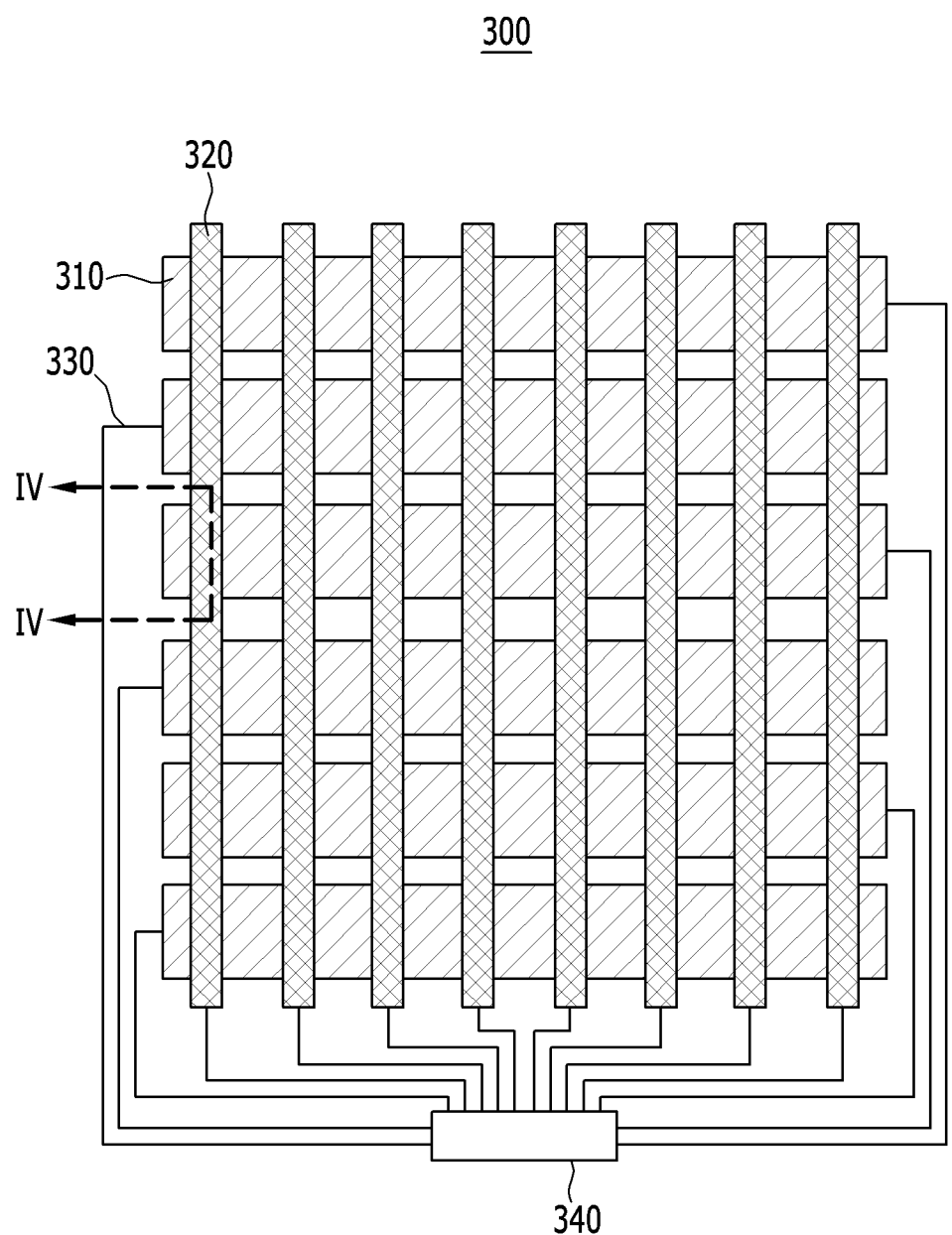
FIG. 3 is a schematic top plan view of a touch screen panel included in a display device according to an exemplary embodiment.

FIG. 3 is a schematic top plan view of a touch screen panel included in a display device according to an exemplary embodiment of the present invention. FIG. 4 is a cross-sectional view of the touch electrode of the touch screen panel of FIG. 3 taken along the line IV-IV.

Figure 4:
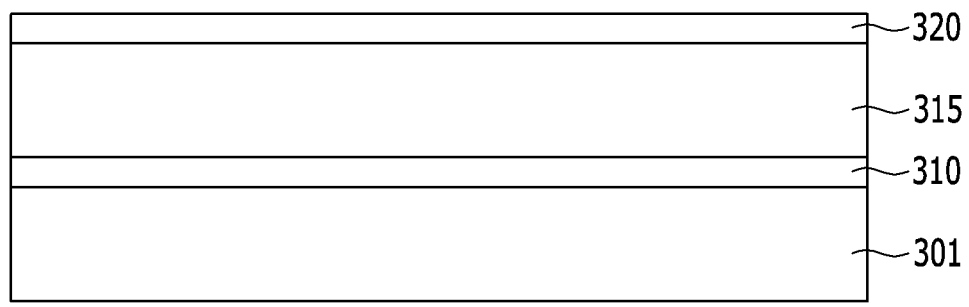
FIG. 4 is a cross-sectional view of the touch electrode of the touch screen panel of FIG. 3 taken along the line IV-IV.

Referring to FIGS. 3 and 4, the touch screen panel 300 includes a transparent substrate 301, a plurality of driving electrodes 310 disposed on the transparent substrate 301, an insulating layer 315 disposed on the plurality of driving electrodes 310, and a sensing electrode 320 disposed on the insulating layer 315. In some embodiments, the plurality of driving electrodes 310 and the plurality of sensing electrodes 320 are connected to a sensing circuit portion 340 through sensing wires 330.

In some embodiments, the transparent substrate 301 may be formed of a transparent polymer compound such as PET (polyethylene terephthalate) and PC (polycarbonate).

In some embodiments, the plurality of driving electrodes 310 may be disposed in a first direction, and the plurality of sensing electrodes 320 may be disposed in a second direction that is perpendicular to the first direction. In some embodiments, the plurality of driving electrodes 310 and the plurality of sensing electrodes 320 may be formed of a transparent conductive layer such as ITO (indium tin oxide). In some embodiments, the plurality of driving electrodes 310 and the plurality of sensing electrodes 320 may be formed of a metal mesh. In some embodiments, the metal mesh may be manufactured by finely patterning metal having high conductivity.

In some embodiments, the metal mesh may be manufactured by a printing manner, an imprinting manner, a lithography manner, or the like. The printing manner is a manner where a transparent electrode (or wire) is directly formed of a transparent conductive material (or metal material) on the substrate by using a gravure or offset manner. The imprinting manner is a manner where after a fine pattern is formed on a transparent conductive layer or a metal layer, and the transparent conductive layer (or metal layer) is etched through the fine pattern to form the transparent electrode (or wire). The lithography manner is a manner where the fine pattern is formed on the substrate through a source such as light, a laser, or an electronic beam and the transparent conductive layer (or metal layer) is etched by using the fine pattern to form the transparent electrode (or wire).

In some embodiments, a plurality of metal patterns forming the metal mesh may be formed of a metal material such as copper (Cu), aluminum (Al), molybdenum (Mo), and silver (Ag) to have a line width of 0.1 μm to 10 μm. The plurality of driving electrodes 310 and the plurality of sensing electrodes 320 formed of the metal mesh have high conductivity and high transparency.

In some embodiments, the insulating layer 315 may be interposed between the plurality of driving electrodes 310 and the plurality of sensing electrodes 320 to separate the plurality of driving electrodes 310 and the plurality of sensing electrodes 320. In some embodiments, an inorganic insulating material such as a silicon oxide ($SiO_x$) or a silicon nitride ($SiN_x$) may be used as the insulating layer 315. In some embodiments, an organic insulating material such as a cellulose derivative, an olefin-based resin, an acryl-based resin, a vinyl chloride-based resin, a styrene-based resin, a polyester-based resin, a polyamide-based resin, a polycarbonate-based resin, a polycycloolefin resin, or an epoxy resin may be used as the insulating layer 315.

In some embodiments, the plurality of driving electrodes 310 and the plurality of sensing electrodes 320 may be separated by the insulating layer 315 to form a capacitance between the driving electrodes 310 and the sensing electrodes 320.

In some embodiments, the sensing circuit portion 340 may apply a touch detection signal to the plurality of driving electrodes 310, and may sense a change in capacitance through the plurality of sensing electrodes 320 to detect a touch position.

In some embodiments, the plurality of driving electrodes 310 and the plurality of sensing electrode 320 of the touch screen panel 300 may be adhered to the display panel 200 by the first adhesive layer 101.

Again referring to FIG. 2, the first light blocking member 111 is disposed at the non-display area ND on the touch screen panel 300. In some embodiments, the first light blocking member 111 may prevent light leakage passing through the non-display area ND and may perform a function to shield an interior of the display device through the non-display area ND from a user. That is, in the entire window of the display device, a portion covered by the first light blocking member 111 becomes the non-display area ND, and a portion that is not covered by the first light blocking member 111 becomes the display area D.

In some embodiments, the first light blocking member 111 may be formed of a black pattern. In some embodiments, the first light blocking member 111 may be formed of a color patter for a design of the non-display area ND.

In some embodiments, the second adhesive layer 102 may be provided to adhere the touch screen panel 300 and the protection window 400 together. In some embodiments, the optical clear adhesive (OCA) may be used as the second adhesive layer 102. In some embodiments, the first adhesive layer 101 may be formed at the display area 101 to adhere the display panel 200 and the touch screen panel 300 together, and in contrast, the second adhesive layer 102 is formed at the display area D and the non-display area ND to adhere the touch screen panel 300 and the protection window 400 together.

In some embodiments, the protection window 400 to protect the display panel 200 and the touch screen panel 300 from an external impact may be made of a transparent material. For example, the protection window 400 may be formed with tempered glass. In some embodiments, the protection window 400 may be formed of a polymer material which is flexible and is capable of being elastically restored as a transparent material such as PMMA (polymethyl methacrylate), PDMS (polydimethylsiloxane), a transparent silicon resin, and polytetrafluoroethylene. In some embodiments, the protection window 400 may be formed at the display area D and the non-display area ND.

Conventionally, the touch screen panel is manufactured with the same size as the display panel to be adhered to the display panel, or a touch function embedded type of display panel in which the touch function is included inside the display panel is manufactured. In this case, the region capable of being touch-input through the touch screen panel is limited to the display area D. Also, an FPC (flexible printed circuit) and an IC (integrated circuit) for the various function keys F disposed at the non-display area ND must be separately provided.

In contrast, as described above, the touch screen panel 300 is formed at the non-display area ND as well as the display area D, so the region capable of touch-input through the touch screen panel 300 may be extended to the display area D and the non-display area ND. That is, the touch function of the touch screen panel 300 may be realized on the entire window of the display device. Also, the various function keys F disposed at the non-display area ND may be realized by the touch screen panel 300 such that it is not necessary to separately provide the FPC and the IC for the function key F, and the configuration of the display device may be simplified.

Also, conventionally, a decorative film on which the pattern for the design or the corporate logo of the non-display area ND is printed may be adhered to the protection window. In contrast, as described above, the first light blocking member 111 is disposed at the non-display area ND on the touch screen panel 300 and the first light blocking member 111 is formed of the color pattern for the design, thereby the additional decorative film for the design of the non-display area ND and the adhesive layer to adhere the decorative film may be omitted. Accordingly, the thickness of the display device may be reduced by the thickness of the decorative film and the adhesive layer to adhere the decorative film compared with the conventional display device.

Figure 5:
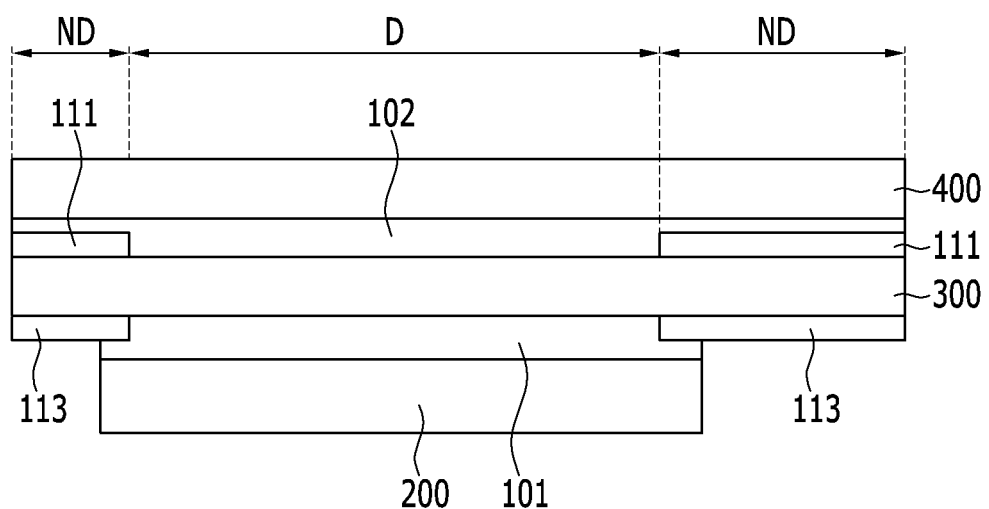
FIG. 5 is a cross-sectional view of a display device according to another exemplary embodiment.

FIG. 5 is a cross-sectional view of a display device according to another exemplary embodiment.

In comparison to the device described in reference to FIG. 2, the display device of FIG. 5 further includes a second light blocking member 113.

When the first light blocking member 111 is disposed at the non-display area ND on the touch screen panel 300, the second light blocking member 113 is disposed at the non-display area ND under the touch screen panel 300.

By forming the display panel 200 at the display area D and the touch screen panel 300 adhered thereto at the display area D and the non-display area ND, in a state that the second light blocking member 113 is not provided, the non-display area ND is exposed outside under the touch screen panel 300. In the touch screen panel 300, the portion that is exposed outside may be easily affected by external physical and chemical influences.

In some embodiments, the second light blocking member 113 may be disposed to protect the portion that is exposed outside in the touch screen panel 300. By disposing the second light blocking member 113 at the non-display area ND under the touch screen panel 300, the touch screen panel 300 may be protected to not be affected by external physical and chemical influences.

The other constituent elements are the same as described in FIG. 2 such that the detailed description thereof is omitted.

Figure 6:
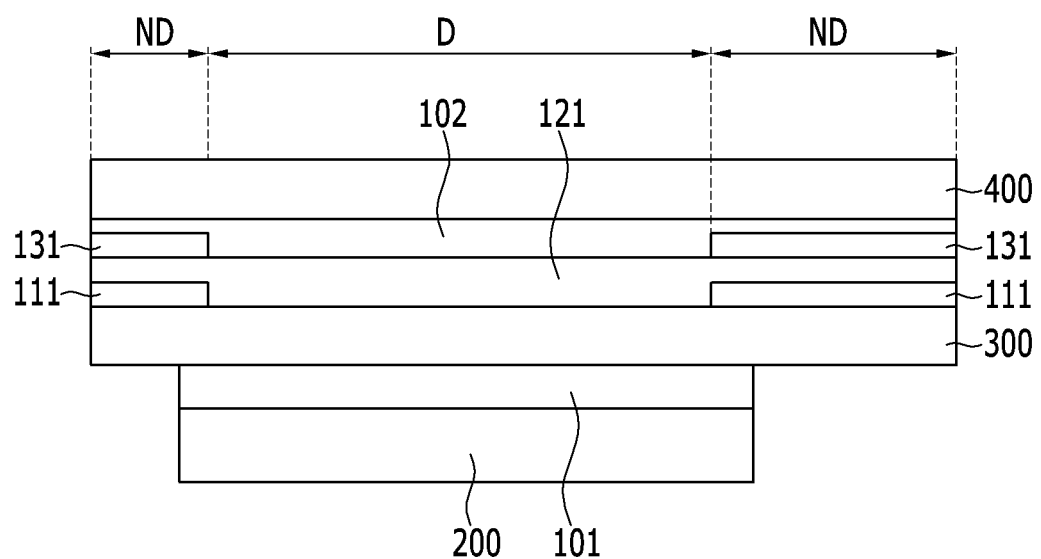
FIG. 6 is a cross-sectional view of a display device according to an exemplary embodiment.

FIG. 6 is a cross-sectional view of a display device according to another exemplary embodiment.

Referring to FIG. 6, the display device includes the display panel 200, the first adhesive layer 101 disposed on the display panel 200, the touch screen panel 300 disposed on the first adhesive layer 101, the first light blocking member 111 disposed at the non-display area ND on the touch screen panel 300, a first coating layer 121 disposed on the touch screen panel 300 and the first light blocking member 111, a second coating layer 131 formed at the non-display area ND on the first coating layer 121, the second adhesive layer 102 disposed on the first coating layer 121 and the second coating layer 131, and the protection window 400 disposed on the second adhesive layer 102.

In comparison to the device described in reference to FIG. 2, the display device of FIG. 6 further includes the first coating layer 121 and the second coating layer 131.

In some embodiments, the first coating layer 121 may be provided to form the pattern for the design of the non-display area ND. That is, in the first coating layer 121, the color pattern for the design may be formed at the portion corresponding to the non-display area ND. In some embodiments, the first coating layer 121 may be formed of an amorphous solid or semisolid made of an organic compound and derivatives thereof. In some embodiments, the first coating layer 121 prevents the protection window 400 from being scattered if the protection window 400 is broken.

In some embodiments, the second coating layer 131 is deposited and coated on the color pattern formed on the first coating layer 121, thereby improving reflectance of the color pattern.

The other constituent elements are the same as described in FIG. 2 such that the detailed description thereof is omitted.

Figure 7:
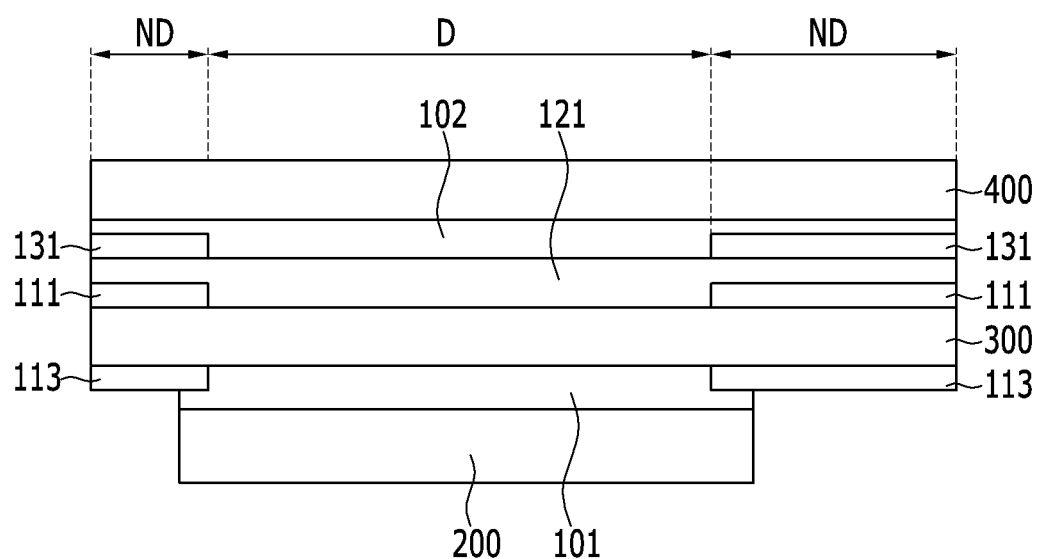
FIG. 7 is a cross-sectional view of a display device according to an exemplary embodiment.

FIG. 7 is a cross-sectional view of a display device according to another exemplary embodiment.

In comparison to the device described in reference to FIG. 6, the display device of FIG. 7 further includes the second light blocking member 113.

When the first light blocking member 111 is disposed at the non-display area ND on the touch screen panel 300, the second light blocking member 113 is disposed at the non-display area ND under the touch screen panel 300.

In some embodiments, the second light blocking member 113 is disposed at the non-display area ND under the touch screen panel 300, thereby protecting the portion exposed outside in the touch screen panel 300 from the external physical and chemical influence.

The other constituent elements are the same as described in FIG. 6 such that the detailed description thereof is omitted.

While one or more embodiments of the present disclosure have been described with reference to the figures, it will be understood by those of ordinary skill in the art that various changes in form and details may be made therein without departing from the spirit and scope of the present embodiments as defined by the following claims.

What is claimed is:

1. A display device comprising:
    an entire window including a display area and a non-display area outside the display area;
    a display panel;
    a touch screen panel including sensing electrodes and disposed on the display panel;
    a first adhesive layer disposed between the display panel and the touch screen panel;
    a first coating layer disposed on the touch screen panel;
    a first light blocking member disposed between and in contact with both the touch screen panel and the first coating layer at the non-display area;
    a second adhesive layer in contact with the first coating layer;
    a protection window in contact with the second adhesive layer; and
    a second coating layer interposed between the first coating layer and the second adhesive layer at the non-display area,
    wherein the second coating layer improves reflectance of the non-display area.

2. The display device of claim 1 wherein the touch screen panel is formed at the entire window.

3. The display device of claim 2, wherein the first light blocking member is formed of a color pattern for a design of the non-display area.

4. The display device of claim 2, wherein the non-display area includes:
    a first portion in which a speaker and a camera lens are disposed; and
    a second portion in which a microphone and a function key are disposed.

5. The display device of claim 2, further comprising a color pattern for the design formed at a portion corresponding to the non-display area in the first coating layer.

6. The display device of claim 5, wherein the second coating layer is configured to improve reflectance of the color pattern.

7. The display device of claim 1, further comprising a second light blocking member disposed at the non-display area.

8. The display device of claim 7, wherein the second light blocking member is on the touch screen panel opposite of the first light blocking member.

9. The display device of claim 1, wherein the second coating layer is in contact with both the second adhesive layer and the first coating layer.

* * * * *